United States Patent Office 3,781,280
Patented Dec. 25, 1973

3,781,280
FLUORO-PYRIDINE DERIVATIVES AND THERAPEUTICALLY ACCEPTABLE SALTS THEREOF
Lars Anders Fritz Carlsson, Bromma, Ake John Erik Helgstrand, Enhorna, and Berndt Olof Harald Sjoberg and Nils Erik Stjernstrom, Sodertalje, Sweden, assignors to Aktiebolaget Astra, Sodertalje, Sweden
No Drawing. Continuation-in-part of application Ser. No. 689,751, Nov. 15, 1967, now Patent No. 3,637,714, dated Jan. 25, 1972. This application Aug. 20, 1971, Ser. No. 173,679
Claims priority, application Sweden, Nov. 16, 1966, 15,717/66; Great Britain, Mar. 23, 1967, 13,687/67; Apr. 26, 1967, 19,174/67
Int. Cl. C07d 31/34
U.S. Cl. 260—240 J  18 Claims

ABSTRACT OF THE DISCLOSURE

Compounds selected from the group consisting of fluoro-pyridine derivatives of the general formula

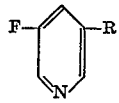

and therapeutically acceptable salts thereof. These compounds exhibit vasodilating properties and are effective in lowering excessive lipid and free fatty acid concentration in serum of animals, including man.

---

This application is a continuation-in-part application of our copendng parent application Ser. No. 689,751 filed Nov. 15, 1967, now U.S. Pat. 3,637,715, granted Jan. 25, 1972.

The present invention relates to serum lipid lowering fluoro-pyridine derivatives having vasodilating properties. These compounds are useful in lowering excessive concentration of free fatty acids in serum of animals, including man.

In view of accumulating evidence indicating that excessive serum lipid concentration is correlated to basic pathogenetic mechanisms and to symptoms of several diseases such as vascular diseases, diabetes mellitus, and hyperthyroidism, lowering of serum lipid concentration is important during treatment of such diseases.

The lowering of serum lipid concentration may be obtained by inhibition of lipid mobilization, e.g. by a decrease in the net release of lipids to the circulation in the form of free fatty acids, from stored triglycerides in adipose tissue.

It has now been found that compounds of the general formula

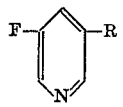

and therapeutically acceptable salts thereof have vasodilating properties and are of particular value for lowering of excessive serum lipid and free fatty acid concentration. In the general Formula I, R is a radical selected from the group consisting of

—COOH,

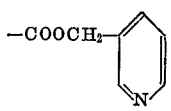

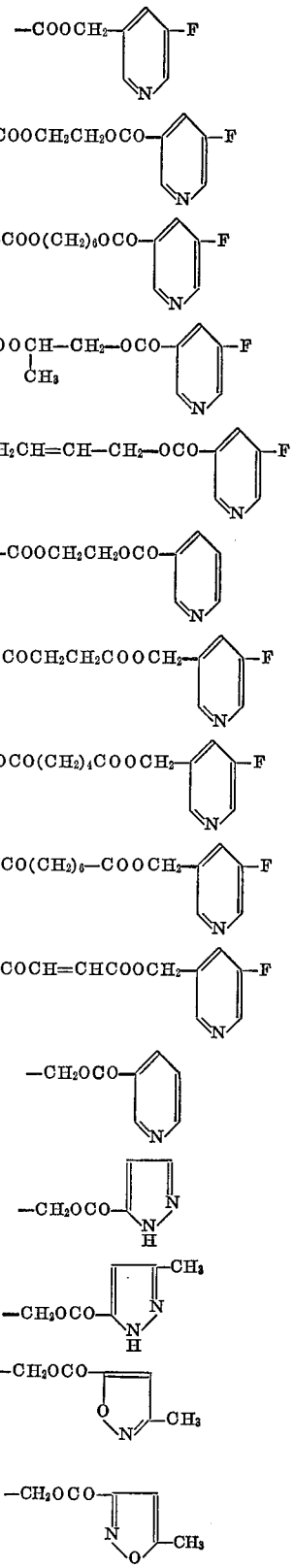

and

The expression "therapeutically acceptable salt" is recognized in the art to designate an acid addition salt which is physiologically innocuous when administered in a dosage and at an interval (e.g. frequency of administration) that is effective for the indicated therapeutic use of the parent compound. Typical therapeutically acceptable acid addition salts include but are not limited to the salts of mineral acids, such as hydrochloric, hydrobromic, phosphoric or sulphuric acid, organic acids such as acetic, lactic, levulinic, citric, fumaric, maleic, succinic, tartaric, benzoic acid and sulphonic acids, such as methane sulphonic acid and sulphamic acid.

Suitable processes for the preparation of the above mentioned compounds are illustrated below. All the illustrated methods of preparation are known in the art. The compounds used as starting materials in the different processes may be prepared according to known methods.

The compound of the formula

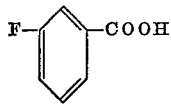

(II)

may be prepared, for example, as described by Roe in U.S. Pat. No. 2,516,830; by carbonation of Grignard reagents (X is halogen)

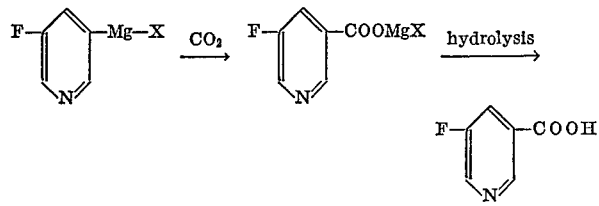

or by oxidation of the corresponding alcohol or aldehyde.

The compound of Formula II may also be prepared by reacting a compound of the formula

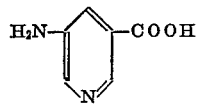

with sodium nitrite and fluoboric acid in an aqueous solution and heating the fluoborate salt thus formed to the formation of a compound of the formula

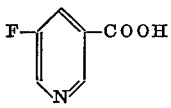

Preferably the reaction of the aminonicotinic acid is carried out in a cooled water solution also containing tetrahydrofuran.

The compounds of the formula

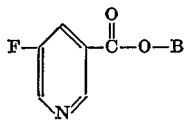

wherein B is a member of the group consisting of

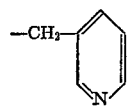

and

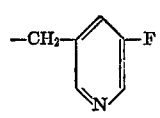

may be prepared by reacting a compound of the formula

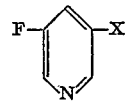

(IV)

with a compound of the formula

Y—B (V)

wherein, in Formulas IV and V, B has the meaning specified above, Y is halogen or a hydroxy group and X is carboxyl, a metal carboxylate group or an activated carboxyl group, in which case the compound of Formula IV is an acid chloride, an alkyl ester, an acid anhydride or a mixed anhydride with alkoxy formic acids, carboxylic acids, sulphonic or inorganic acids or derivatives obtained by a reaction between a carboxylic acid and a carbodiimide or similarly functioning compounds such as N,N$^1$-carbonyldiimidazole or N-ethyl-5-phenylisoxazolium-3$^1$-sulphonate, X being a metal carboxylate group when Y is halogen, whereafter the compound of Formula III thus obtained if necessary is transformed into a therapeutically acceptable salt by reaction with the appropriate acid.

The reaction may be performed in the presence of aqueous or anhydrous organic solvents such as chloroform, diethyl ether, tetrahydrofuran, benzene and toluene, or without solvents. Particularly when X represents a carboxyl group and Y is a hydroxy group, there may be used an acid catalyst such as sulphuric acid, hydrogen chloride, p-toluene sulphonic acid, benzene sulphonic acid or salts with high to intermediate acid strength, even including ion exchangers saturated with hydrogen ions. In this case, in order to get a more favorable equilibrium, the water formed during the reaction may be removed from the reaction mixture by azeotropic distillation or taken up by drying agents such as anhydrous cupric or manganese sulphate and molecular sieves. When the compound of Formula IV is an acid halide, the hydrogen halide liberated may be neutralized and the reaction catalyzed by a base such as pyridine and triethylamine.

Compounds of the formula

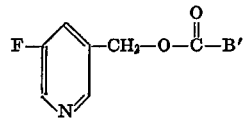

(VI)

wherein B' is selected from the group consisting of

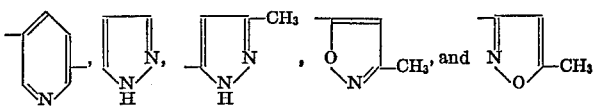

may be prepared by reacting a compound of the formula

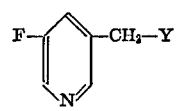

(VII)

with a compound of the formula

X—B' (VIII)

wherein X, Y and B' have the meaning specified above. The reaction conditions are the same as for preparation of the nicotinic acid esters. The compounds of Formula VI thus obtained are transformed, if necessary, into a therapeutically acceptable salt by reaction with the appropriate acid.

Diesters of pyridine of the general formulas

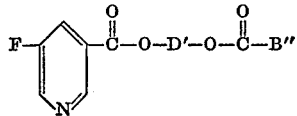

(IX)

and

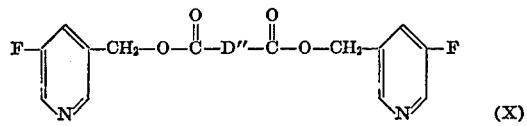

(X)

wherein, in Formula IX, D' is selected from the group consisting of —(CH$_2$)$_2$—, —(CH$_2$)$_6$—,

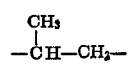

and —CH₂CH=CH—CH₂—; and B″ is the radical

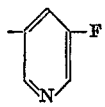

or, provided D′ is —(CH₂)₂—, B″ may also be

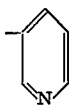

and wherein, in Formula X, D″ is selected from the class consisting of —(CH₂)₂—, —(CH₂)₄—, —(CH₂)₆—, and —CH=CH—, may be prepared by reacting compounds of the formulas

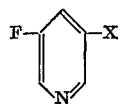

and

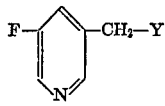

respectively, with compounds of the formulas

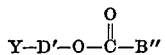

and

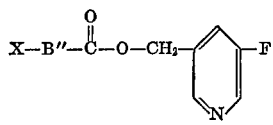

respectively, or by reacting compounds of the formulas

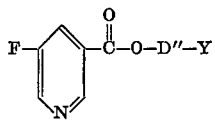

and

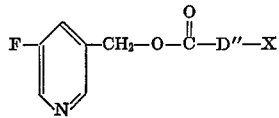

respectively, with compounds of the formula X—B″ and

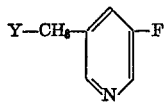

respectively, wherein X and Y have the meaning specified previously. The reaction conditions are the same as for preparation of the nicotinic acid esters.

In the case where the compounds of Formula IX

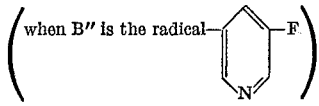

and Formula X are

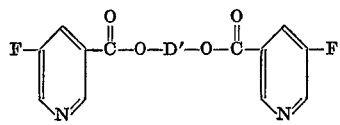

and

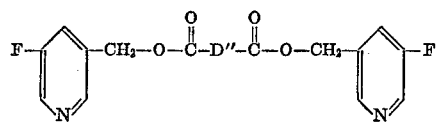

respectively, they can be prepared by reacting compounds of the formulas

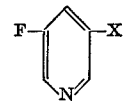

and

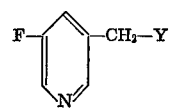

respectively, with compounds of the formulas

and
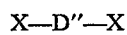

respectively, wherein X and Y have the meaning specified above. The reaction conditions are the same as for preparation of the nicotinic acid esters.

In treating animals, including man, the compounds of the invention may be administered orally or by injection in the form of pharmaceutical preparations comprising a therapeutically effective amount of at least one of the previously disclosed pyridine derivatives as the active ingredient. The active ingredient may be present either as a free base or as a therapeutically acceptable acid addition salt, e.g. the hydrochloride, hydrosulphate, or the like, in association with a pharmaceutically acceptable carrier. The carrier may be a solid, semisolid or liquid diluent or an ingestible capsule. The active ingredient may be a mixture of one or more fluoro-pyridine derivatives according to the invention or a mixture of their salts or a combination of different compounds and salts. Accordingly, terms relating to the novel compounds of this invention whether generically or specifically are intended to include both the free base and the acid addition salts of the free base, unless the context in which such terms are used, e.g. in the specific examples, would be inconsistent with the broad meaning.

Usually the active substance will constitute between 0.1 and 95% by weight of the preparation, more especially between 0.5 and 20% by weight for preparations intended for injection and between 2 and 50% by weight for preparations suitable for oral administration.

To produce pharmaceutical preparations containing a compound of the invention in the form of dosage units for oral application, the selected compound may be mixed with a solid pulverulent carrier, e.g. lactose, saccharose, sorbitol, mannitol; starches such as potato starch, corn starch or amylopectin; cellulose derivatives, or gelatin, and a lubricant such as magnesium stearate, calcium stearate, a polyethylene glycol wax and the like, and then compressed to form tablets. If coated tablets are required, the cores, prepared as described above, may be coated with a concentrated sugar solution which may, for example, contain gum arabic, gelatin, talcum, titanium dioxide, or the like. Alternatively, the tablet can be coated with a lacquer dissolved in a readily volatile organic solvent or mixture of organic solvent. Dyestuffs may be added to these coatings in order to readily distinguish between tablets containing different active components or different amounts of the active compound.

By using several layers of the active drug, separated by slowly dissolving coats, sustained release tablets are obtained. Another way of preparing sustained release tablets is to divide the dose of the active drug into granules with coats of different thickness and compress the granules into tablets together with the carrier substance. The active substance can also be incorporated in slowly dissolving tablets made for instance of fat and wax substances or evenly distributed in a tablet of an insoluble substance such as a physiologically inert plastic substance.

Effervescent powders are prepared by mixing the active ingredient with non-toxic carbonates or hydrogen carbonates, such as calcium carbonate, potassium carbonate and potassium hydrogen carbonate, solid, non-toxic acids such as tartaric acid and citric acid.

For the preparation of soft gelatin capsules (pearl-shaped closed capsules) consisting of gelatin and for example glycerol or similar closed capsules, the active substance may be admixed with a vegetable oil. Hard gelatin capsules may contain granulates of the active substance in combination with solid, pulverulent carriers such as lactose, saccharose, sorbitol, mannitol, a starch (e.g. potato starch, corn starch or amylopectin), a cellulose derivative or gelatin.

Liquid preparations for oral application may be in the form of syrups or suspensions, for example solutions containing from 0.2% to 20% by weight of the active substance, the balance being sugar and a mixture of ethanol, water, glycerol, and propylene-glycol. Optionally such liquid preparations may contain coloring agents, flavoring agents, saccharin and carboxymethyl-cellulose as a thickening agent.

Solutions for parenteral application by injection can comprise aqueous solutions of a water-soluble pharmaceutically acceptable salt of the active substance, preferably in a concentration of 0.5% to 10% by weight. These solutions may also contain stabilizing agents or buffering agents, or both and may conveniently be provided in various dosage unit ampoules.

The following examples illustrate the invention:

Example 1.—Preparation of 5-fluoronicotinic acid

A mixture of 5-aminonicotinic acid (108 g.) in 700 ml. of fluoboric acid (48–50% w./w.), 530 ml. of tetrahydrofuran and 350 ml. of water was cooled in an ice-salt bath and with stirring sodium nitrite (71 g.) in a saturated water solution was added at such a rate that the temperature was lower than 3° C. 350 ml. of tetrahydrofuran was added and the mixture stirred for one hour at −5° C. to −10° C. The precipitate formed was filtered off and thoroughly washed with cold ethanol, cold ether and petroleum ether until it was nearly colorless. This fluoborate salt was transferred to a large flask fitted with a stirrer and two reflux condensers and with about 500 ml. of dry ligroin (B.P. about 100° C.) and the flask was gently heated with an open flame at one point. An exothermic reaction started which soon spread to the whole mass of the salt. The decomposition was completed by refluxing for 30 minutes. The ligroin phase was decanted and the yellow product washed with ether. The product was dissolved in dilute aqueous sodium bicarbonate and reprecipitated with dilute aqueous hydrochloric acid. The precipitate was washed with water and dried to give 67 g. of weakly yellow product. This product may be purified by recrystallization, treatment with active carbon and a final sublimation to give a colorless product, M.P. 194° C. Identity was also established by IR-spectroscopy.

Example 2.—5-fluoro-3-pyridinemethyl 5-fluoronicotinate 5-fluoronicotinic acid (5.94 g.) was refluxed 4.5 hours with 24 ml. of thionyl chloride. Excess thionyl chloride was evaporated and the residue heated for 10 minutes at 80° C. with a mixture of chloroform (20 ml.) and pyridine (8 ml.). The solution was cooled in an ice-bath and a solution of 5-fluoro-3-pyridinemethanol (5.10 g.) in 15 ml. of chloroform was added with stirring during 30 minutes. The reaction mixture was stirred at room temperature for 2 hours and was then allowed to stand overnight. The mixture was poured out on ice-water and the chloroform phase separated and washed twice with a saturated aqueous solution of sodium hydrogen carbonate. The chloroform solution was dried over anhydrous sodium sulfate, filtered and the solvent evaporated to give 9.0 g. of nearly colorless product, M.P. 105.5–106.0° C. Analyses.—Found (percent): C, 57.84; H, 3.35; F, 15.41; N, 11.11. Calculated for $C_{12}H_8F_2N_2O_2$ (percent): C, 57.60; H, 3.22; F, 15.19; N, 11.20.

The following compound was prepared in an analogous way:

3-pyridinemethyl 5-fluoronicotinate: Yield 75%. M.P. 56.6–57.0° C. (prisms) and 62.0–63.0° C. (needles). Analyses.—Found (percent): C, 62.21; H, 4.02; F, 8.35; N, 12.03. Calculated for $C_{12}H_9FN_2O_2$ (percent): C, 62.07; H, 3.91; F, 8.18; N, 12.07.

Example 3.—5-fluoro-3-pyridinemethyl 5-fluoronicotinate

To a stirred suspension of 5-fluoronicotinic acid (7.05 g.) and 5-fluoro-3-pyridinemethanol (6.35 g.) in 70 ml. of anhydrous dioxane, a solution of N,N-dicyclohexylcarbodiimide (10.3 g.) in 50 ml. of anhydrous dioxane was added during one hour with ice-cooling. The reaction mixture was stirred at room-temperature during 16 hours and was then poured on a small amount of cold ethyl acetate. The urea precipitated was filtered off and the filtrate evaporated. The yellow semi-solid residue was dissolved in a small amount of chloroform, put on a short column of aluminum oxide and eluted with 200 ml. of chloroform. The residue after evaporation of the form solution was recrystallized from petroleum ether with a little ethanol added. The product, 4.2 g., M.P. 105–106° C., was identical with the one prepared according to Example 2.

Example 4.—5-fluoro-3-pyridinemethyl nicotinate

Nicotinic acid (3.7 g.) was refluxed 1 hour with thionyl chloride (11.9 g.). Evaporation of excess thionyl chloride gave 4.95 g. of crude nicotinic acid chloride hydrochloride, which was covered with 10 ml. of anhydrous benzene. To this mixture a solution of 5-fluoro-3-pyridinemethanol in a mixture of 12 ml. of trimethylamine and 40 ml. of benzene was added with stirring. The resulting mixture was refluxed for 5 hours. After cooling the triethylamine hydrochloride was filtered off and washed with benzene. The combined washings and the filtrate were evaporated in vacuo to give a semi-solid residue. The crude product was recrystallized from petroleum ether to give 3.5 g. of crystals with M.P. 65–67.5° C. Repeated recrystallizations from petroleum ether gave a completely colorless product with M.P. 68.5–69.5° C. Analyses.—Calculated for $C_{12}H_9FN_2O_2$ (percent): C, 62.07; H, 3.91; F, 8.18; N, 12.07; O, 13.78. Found (percent): C, 62.03; H, 3.87; F, 8.05; N, 12.14.

Example 5.—3-pyridineethyl 3-pyridineacetate

A mixture of 3-pyridineacetic acid (10.4 g.) 3-pyridinemethanol (9.3 g.) and concentrated sulfuric acid (10 ml.) in 200 ml. of benzene was refluxed during 6 hours. The reaction water formed was continuously taken away by azeotropic distillation. The benzene phase was decanted and the oily residue dissolved in 50 ml. of cold water and the solution made alkaline with aqueous sodium carbonate. The alkaline mixture was extracted several times with diethyl ether, the extract dried over anhydrous potassium carbonate, filtered and the solvent evaporated to give 9.1 g. product. Distillation in vacuo gives 7.3 g. product, B.P. 162–162.5° C./0.3 mm. Hg; $n_D^{25}=1.5540$; hydrochloride M.P. 126–127° C. Analyses (hydrochloride).—Found (percent): C, 52.8; H, 5.26; N, 8.76; O, 9.96; Cl, 22.65. Calculated for $$C_{14}H_{16}N_2O_2Cl_2$$

(percent): C, 53.34; H, 5.12; N, 8.89; O, 10.15; Cl, 22.49.

In an analogous way the following compounds were prepared:

5-fluoro-3-pyridinemethyl 3-pyridinebutyrate: Reflux period 70 hours with p-toluenesulfonic acid instead of sulfuric acid. Yield 60%. $n_D^{25}=1.535$. Analyses.—Found (percent): C, 65.55; H, 5.49; F, 6.80; N, 10.40. Calculated for $C_{15}H_{15}FN_2O_2$ (percent): C, 65.68; H, 5.51; F, 6.93; N, 10.21.

5-fluoro-3-pyridinemethyl 3-pyridineacetate: Reflux period 20 hours with p-toluenesulfonic acid instead of sulfuric acid. Yield 60%. M.P. 58.0–60.0° C. Analyses.—Found (percent): C, 63.33; H, 4.77; F, 7.55; N, 11.53. Calculated for $C_{13}H_{11}FN_2O_2$ (percent): C, 63.41; H, 4.50; F, 7.72; N, 11.38.

Example 6.—Pyridine-3-methyl 5-methyl-pyrazole-3-carboxylate 5-methylpyrazole-3-carboxylic acid (5.05 g.) and 3-pyridinemethanol (4.36 g.) was refluxed together with p-toluenesulfonic acid monohydrate (19 g.) in 100 ml. of benzene. A water-separator was used in order to withdraw the water in the reaction mixture. After 27 hours the benzene phase of the reaction mixture was decanted and the residue treated with excess aqueous sodium bicarbonate. The aqueous mixture was extracted with the decanted benzene phase and three portions of chloroform. The combined extracts were dried over anhydrous sodium sulfate, filtered and the solvent evaporated to give 4.9 g. of a yellow oil which spontaneously crystallized upon cooling. After recrystallization from benzene the product melted at 123.5–124.5° C. Analyses.—Found (percent): C, 60.5; H, 5.12; N, 19.4; O, 14.9. Calculated for $C_{11}H_{11}N_3O_2$ (percent): C, 60.82; H, 5.11; N, 19.34; O, 14.73.

In an analogous way using toluene as solvent, the following esters were also prepared:

5-fluoropyridine - 3-methyl 5-methylpyrazole-3-carboxylate, yield 75%, M.P. 141.5–143° C. Analyses.—Found (percent): C, 55.96; H, 4.36; F, 7.96; N, 17.75. Calculated for $C_{11}H_{10}FN_3O_2$ (percent): C, 56.17; H, 4.29; F, 8.08; N, 17.86.

5-fluoropyridine-3-methyl pyrazole-3-carboxylate, yield 75%, M.P. 162° C.; equivalent weight found: 219; Calculated 221.

Example 7.—5-fluoro-3-pyridinemethyl acetate

To 50 ml. of stirred acetic anhydride, 5-fluoro-3-pyridinemethanol (10.2 g.) was added slowly at room temperature. The reaction solution was allowed to stand for 3 days and then excess acetic anhydride was driven off in vacuo. The residue was distilled in vacuo to give 9.3 g. of colorless product, B.P. 102–105° C./10 mm. Hg. $n_D^{25}=1.4850$. Analyses.—Found (percent): C, 57.02; H, 4.87; F, 11.07; N, 8.45. Calculated for $C_8H_8FNO_2$ (percent): C, 56.80; H, 4.76; F, 11.23; N, 8.28.

Example 8

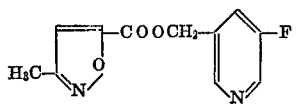

5-fluoro-3-pyridinemethyl 3-methyl-5-isoxazolecarboxylate: 3-methyl-5-isoxazolecarboxylic acid (6.35 g.), 5-fluoro-3-pyridinemethanol (6.35 g.) and p-toluenesulfonic acid monohydrate (14.3 g.) was refluxed 47 hours in 100 ml. of toluene. The water in the reaction mixture was continuously removed by azeotropic distillation. The residue after evaporation of the solvent was treated with an excess of saturated aqueous solution of sodium hydrogen carbonate. The precipitate was filtered off and recrystallized from diisopropyl ether to give 4.75 g. weakly yellow product, M.P. 79–81° C., which could be rised to 80.0–81.5° C. by repeated recrystallizations from diisopropylether. Analyses.—Found (percent): C, 55.35; H, 3.08; F, 8.31; N, 11.90. Calculated for $$C_{11}H_9FN_2O_3$$

(percent): C, 55.93; H, 3.84; F, 8.04; N, 11.86.

In the same way 5-fluoro-3-pyridinemethyl 5-methyl-3-isoxazolecarboxylic acid was prepared; M.P. 69.0–71.5° C. Analyses.—Found (percent): C, 56.03; H, 3.97; F, 7.79; N, 11.54. Calculated for $C_{11}H_9FN_2O_3$ (percent): C, 55.93; H, 3.84; F, 8.04; N, 11.86.

Example 9.—Diester of 5-fluoronicotinic acid and ethylene glycol 5-fluoronicotinic acid was refluxed for 3.5 hours with 60 ml. of thionyl chloride. Excess thionylchloride was distilled off in vacuo and the residue heated with a mixture of pyridine (25 ml.) and benzene (50 ml.) at 60–70° C. during one hour. The solution was cooled in an ice-bath and ethylene glycol (1.50 g.) was added with stirring. The mixture was allowed to stand for 24 hours at room temperature and was then poured out on 200 ml. of ice-water. The aqueous mixture was made alkaline with sodium hydrogen carbonate and extracted with four portions of diethyl ether. The extract was dried over anhydrous sodium sulphate, filtered and the solvent evaporated to give a crystalline residue, which was triturated with a little cold petroleum ether. Yield 6.21 g., M.P. 84–90° C. Recrystallization from diisopropyl ether gave 5.35 g. of colorless product with M.P. 91.0–91.5° C. Analyses.—Found (percent): C, 54.88; H, 33.39; F, 12.53; N, 9.05; Calculated for $C_{14}H_{10}F_2N_2O_4$ (percent): C, 54.55; H, 3.27; F, 12.33; N, 9.09%.

In an analogous way the following compounds were prepared:

Diester of 5-fluoronicotinic acid and hexane-1,2-diol: Yield 80%; M.P. 56.0–56.5° C. Analyses.—Found (percent): C, 59.75; H, 5.16; F, 11.07; N, 8.17. Calculated for $C_{18}H_{18}F_2N_2O_4$ (percent): C, 59.34; H, 4.98; F, 10.43; N, 7.69.

Diester of 5-fluoronicotinic acid and propane-1,2-diol: Yield 50%; M.P. 192–194° C./0.3 mm. Hg; $n_D^{25}=1.5200$. Analyses.—Found (percent): C, 55.66; H, 4.17; F, 11.90; N, 8.54. Calculated for $C_{15}H_{12}F_2N_2O_4$ (percent) C, 55.91; H, 3.75; F, 11.79; N, 8.69.

Diester of 5-fluoronicotinic acid and trans-2-butene-1,4 diol: Yield 75%; M.P. 115.5–116.0° C. Analyses.—Found (percent): C, 57.67; H, 3.70; F,11.24; N, 8.24; Calculated for $C_{16}H_{12}F_2N_2O_4$ (percent): C, 57.49.

Example 10.—Diester of succinic acid and 5-fluoro-3-pyridine methanol

Succinic acid (2.36 g.), 5-fluoro-3-pyridine methanol (5.1 g.) and p-toluene sulfonic acid monohydrate (10.0 g.) were refluxed 23 hours in 50 ml. of benzene. The water in the reaction mixture was continuously removed by azeotropic distillation. The mixture was poured out on ice-water and made alkaline with sodium hydrogen carbonate. The precipitate formed was filtered off, washed with water and dried. It weighed 2.9 g., M.P. 80.0–81.0° C., after recrystallization from ether-ethanol, M.P. 80.0–81.5° C. Analyses.—Found (percent): C, 57.30; H, 4.22; F, 11.33; N, 8.57. Calculated for $C_{16}H_{14}F_2N_2O_4$ (percent): C, 57.14; H, 4.20; F, 11.30; N, 8.33.

In an analogous way the following compounds were also prepared:

Diester of adipic acid and 5-fluoro-3-pyridine methanol: Yield 65%; M.P. 57.0–57.5° C. Analyses.—Found (percent): C, 59.59; H, 4.96; F, 10.59; N, 7.70. Calculated for $C_{18}H_{18}F_2N_2O_4$ (percent): C, 59.34; H, 4.98; F, 10.43; N, 7.69.

Diester of suberic acid and 5-fluoro-3-pyridine methanol: Yield 45%; M.P. 63.0–64.0° C. Analyses.—Found (percent): C, 61.40; H, 5.60; F, 9.53; N, 7.09. Calculated for $C_{20}H_{22}F_2N_2O_4$ (percent): C, 61.22; H, 5.65; F, 9.68; N, 7.14.

Diester of fumaric acid and 5-fluoro-3-pyridine methanol: Yield 30%; M.P. 120.5–122° C. Equivalent weight (titration as base): Found 167. Calculated for $C_{16}H_{12}F_2N_2O_4$: 167.2. The identity and purity of the product was also established by NMR spectroscopy.

Example 11

PHARMACOLOGICAL TESTS

Compounds according to the invention were tested with regard to lowering the concentration of free fatty acids in the serum of dogs according to the method described in Carlsson, L. A. and Liljedahl, S. O., "Lipid Metabolism and Trauma. 11. Studies on the Effect of Nicotinic Acid on Norepinephrine Induced Fatty Liver." Acta Med. Scand. 173, (1963) 787–791 and Bergstrom, S., Carlsson, L. A. and Oro, L. "Effect of Prostaglandins on Catecholamine Induced Changes in the Free Fatty Acids of Plasma and in Blood Pressure in the Dog. Prostaglandin and Related Factors 22," Acta Physiol. Scand. 60, (1964), 170–180. According to this method, the compound is tested on a model for the stress situation in which noradrenaline stimulated lipid mobilization is known to occur.

Anaesthetized dogs were given continuous intravenous infusions of noradrenaline at a constant rate (0.5 μg./kg. bodyweight per minute). The test substance was injected intravenously 60 min. after the start of infusion. The arterial level of free fatty acids as a function of time was followed. Nicotinic acid was used as reference. The qualitative effect is given in Table I.

The qualitative effect was judged from the total depression of free fatty acid serum concentration and the duration of the depression. The effect of each compound was judged from the relative depression "a," as calculated in percent of the total rise in free fatty acid serum concentration induced by the noradrenaline infusion, and from the total duration, "b" (minutes) of more than a 50% depression of free fatty acid serum concentration. The test results at a dosage level of 25 mg./kg. are classified according to the following scheme:

| a, percent | b, minutes | Effect |
|---|---|---|
| >80 | >100 | ++++ |
| >80 | <100 | +++ |
| 20–79 | >100 | ++ |
| 20–79 | <100 | + |
| <20 | | 0 |

TABLE I

| Compound | Qualitative effect |
|---|---|
| Nicotinic acid (reference) | +++ |
| 5-fluoronicotinic acid | ++++ |

$R^1$—(pyridine ring)—$(CH_2)_m$—C(=O)—O—$(CH_2)_n$—(pyridine ring)—$R^2$

| m | n | $R^1$ | $R^2$ | |
|---|---|---|---|---|
| 0 | 1 | F | H | ++++ |
| 0 | 1 | H | F | ++++ |
| 0 | 1 | F | F | ++++ |

F—(pyridine)—$CH_2O$—C(=O)—(imidazole with $CH_3$, NH) ++++

TABLE I—Continued

| Compound | Qualitative effect |
|---|---|

F—(pyridine)—$CH_2$—O—C(=O)—O—(N-methyl ring with $CH_3$) ++++

$R^1$—(pyridine)—C(=O)—O—$R^2$—O—C(=O)—(pyridine)—$R^3$

| $R^1$ | $R^3$ | $R^2$ | |
|---|---|---|---|
| F | F | —$CH_2$—$CH_2$— | ++++ |
| H | F | —$CH_2$—$CH_2$— | ++++ |
| F | F | —$(CH_2)_6$— | +++ |
| F | F | —CH—$CH_2$—  \| $CH_3$ | +++ |
| F | F | $H_2C$\C=C/H  H/ \$CH_2$— | +++ |

$R^1$—(pyridine)—$CH_2$—O—C(=O)—$R^2$—C(=O)—O—$CH_2$—(pyridine)—$R^3$

| $R^1$ | $R^3$ | $R^2$ | |
|---|---|---|---|
| F | F | —$CH_2$—$CH_2$— | ++++ |
| F | F | —$(CH_2)_4$— | ++++ |
| F | F | —$(CH_2)_6$— | ++++ |
| F | F | —CH=CH—(trans.) | ++++ |

5-fluoronicotinic acid has a low toxicity. The toxicity of 5-fluoronicotinic acid upon i.p. administration in mice given as the $LD_{50}$-value was found to be 2.0 g./kg. bodyweight. The corresponding toxicity of nicotinic acid was found to be 0.5 g./kg. bodyweight.

The resorption of 5-fluoronicotinic acid in serum of dogs was studied. 200 mg. of the test compound were orally administered to the dog in the form of a tablet also containing 200 mg. of physiologically inert material. The amount of the test compound in the blood serum was analyzed at different times according to Hughes, D. E. and Williamson, D. H., Biochem. J. 55 (1953), 851. A comparison with nicotinic acid was made in each case. The maximum resorption and the duration (given as the time after administration when the serum concentration had decreased to 25% of the maximum concentration) is given Table II.

TABLE II

| Compound | Maximum resorption (γ ml. serum) | Duration (hours) |
|---|---|---|
| 5-fluoronicotinic acid | 59.3 | 7.2 |
| Nicotinic acid | 53.2 | 1.9 |

PHARMACEUTICAL PREPARATIONS

Example 12.—Preparation of tablets containing 5-fluoronicotinic acid 100 g. of 5-fluoronicotinic acid were mixed with 50 g. of lactose and 45 g. of potato starch and moistened with a starch paste prepared from 5 g. of potato starch and distilled water, whereafter the mixture was granulated through a sieve. The granulate was dried and sieved whereafter 2 g. of magnesium stearate were added. Finally the mixture was pressed into tablets, each weighing 202 mg.

13

Example 13.—Preparation of a syrup containing vitamins and 5-fluoronicotinic acid The syrup was prepared from the following ingredients:

| | | |
|---|---|---|
| 5-fluoronicotinic acid | g | 7.0 |
| Polyoxyethylenesorbitol monooleate | g | 0.4 |
| Vitamin A | IE | 12.000 |
| Vitamin C | g | 2 |
| Vitamin $B_1$ | mg | 50 |
| Vitamin $B_2$ | mg | 70 |
| Vitamin $B_6$ | mg | 10 |
| Pantothenol | mg | 100 |
| Caffeine | m | 300 |
| Sorbitol | mg | 20 |
| Aroma, color, q.s. | | |
| Water to 100 ml. | | |

Vitamin A was dissolved in the polyoxyethylene sorbitan monooleate while heating to about 60° C., whereafter 20 m. of water was mixed in. The caffeine was dissolved in 10 ml. of water, while heating to about 90° C. The remaining ingredients were mixed in about 60 ml. of water, whereafter the vitamin A and caffeine solutions were added while stirring. The pH was adjusted to 4.5–5.5 by addition of sodium hydroxide solution and the syrup made up to 100 ml. with water. The whole procedure was carried out in nitrogen atmosphere. A normal dose is contained in 15 ml. of the syrup.

Example 14.—Preparation of a drop solution containing 5-fluoronicotinic acid 100 g. of 5-fluoronicotinic acid were mixed with 300 g. of ethanol, whereafter 300 g. of glycerol, water to 1.000 ml. aroma and color (q.s.) and 0.1 N sodium hydroxide solution (to pH 4.5–5.5) were added while stirring. A drop solution was thus obtained.

Example 15.—Preparation of a sustained release tablet containing 5-fluoronicotinic acid 200 g. of 5-fluoronicotinic acid were melted together with 50 g. of stearic acid and 50 g. of carnauba wax. The mixture thus obtained was cooled and ground to a particle size of at most 1 mm. (diameter). The mass thus obtained was mixed with 5 g. of magnesium stearate and pressed into tablets each weighing 305 mg. Each tablet thus contains 200 mg. of active substance.

Thus, novel fluoro-pyridine derivatives are now provided which have valuable vasodilating properties and which are effective in lowering excessive lipid and free fatty acid concentration in serum.

While the foregoing specification is an accurate and complete disclosure, it is not intended to limit the scope of the invention as defined by the following claims.

We claim:
1. A compound selected from the group of fluoro-pyridine derivatives having the general formula

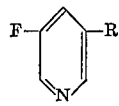

and therapeutically acceptable salts thereof, wherein R is

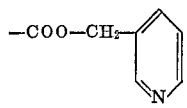

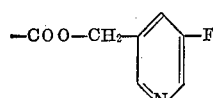

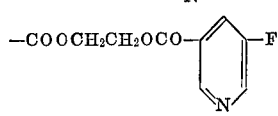

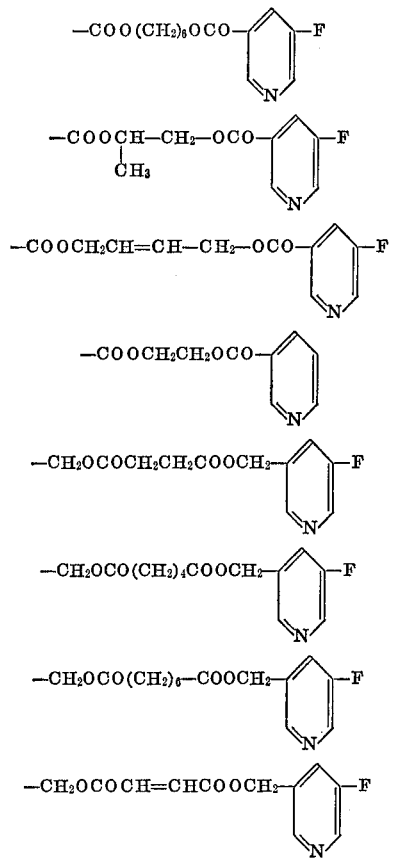

or

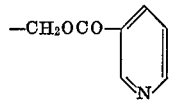

2. A compound according to claim 1,

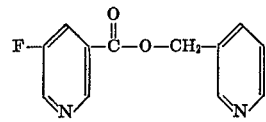

or a therapeutically acceptable salt thereof.

3. A compound according to claim 1,

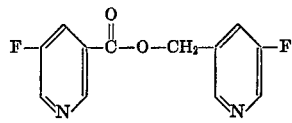

or a therapeutically acceptable salt thereof.

4. A compound according to claim 1,

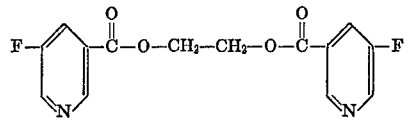

or a therapeutically acceptable salt thereof.

5. A compound according to claim 1,

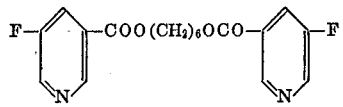

or a therapeutically acceptable salt thereof.

6. A compound according to claim 1,

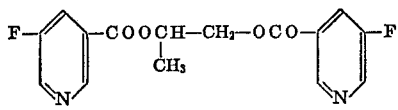

or a therapeutically acceptable salt thereof.

7. A compound according to claim 1,

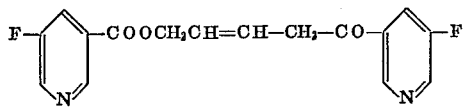

or a therapeutically acceptable salt thereof.

8. A compound according to claim 1,

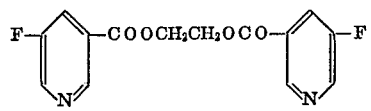

or a therapeutically acceptable salt thereof.

9. A compound according to claim 1,

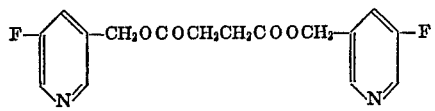

or a therapeutically acceptable salt thereof.

10. A compound according to claim 1,

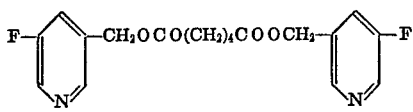

or a therapeutically acceptable salt thereof.

11. A compound according to claim 1,

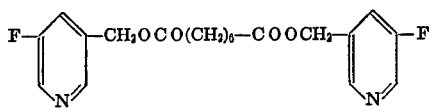

or a therapeutically acceptable salt thereof.

12. A compound according to claim 1,

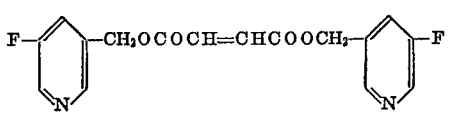

or a therapeutically acceptable salt thereof.

13. A compound according to claim 1,

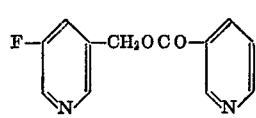

or a therapeutically acceptable salt thereof.

14. A compound selected from the group consisting of fluoro-pyridine derivatives having the general formula

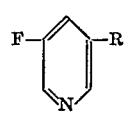

and therapeutically acceptable salts thereof, wherein R is

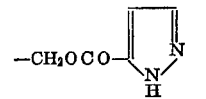

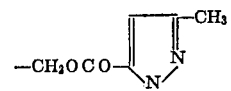

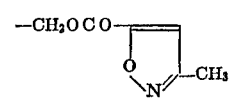

or

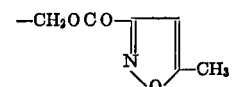

15. A compound according to claim 14,

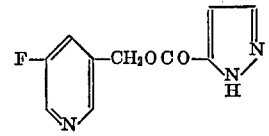

or a therapeutically acceptable salt thereof.

16. A compound according to claim 14,

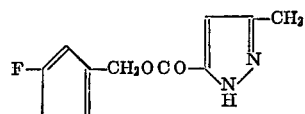

or a therapeutically acceptable salt thereof.

17. A compound according to claim 14,

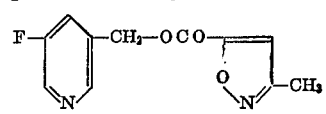

or a therapeutically acceptable salt thereof.

18. A compound according to claim 14,

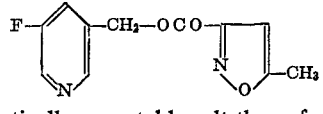

or a therapeutically acceptable salt thereof.

References Cited
UNITED STATES PATENTS 3,466,294   9/1969   Hyden et al. _____ 260—295.5
3,637,714   1/1972   Carlsson et al. ____ 260—294.8 R

OTHER REFERENCES

Hawkins et al., J. Org. Chem., vol. 14, pp. 328–332 (1949).
Streightoff, J. Bacteriol., vol. 85, pp. 42–48 (1963).
Chemical Abstracts, vol. 70, p. 316 (abst. of S. African Pat. 67/6,685), Abst. No. 87582h (1969).
Chemical Abstracts, vol. 71, p. 436 (abst. of S. African Pat. 68/1,823) Abst. No. 61225Q (1969).

JOHN D. RANDOLPH, Primary Examiner

U.S. Cl. X.R.

260—295 R, 295.5 R; 424—264, 266

UNITED STATES PATENT OFFICE
CERTIFICATE OF CORRECTION

Patent No. 3,781,280  Dated December 25, 1973

Inventor(s) Lars Anders Fritz Carlsson et al.

It is certified that error appears in the above-identified patent and that said Letters Patent are hereby corrected as shown below:

Col. 3, line 22, after "COOMgX", insert -- 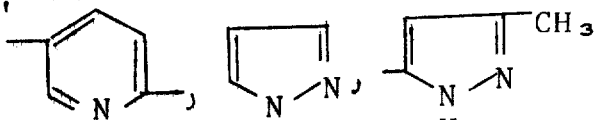 --;
Col. 4, line 40, change " 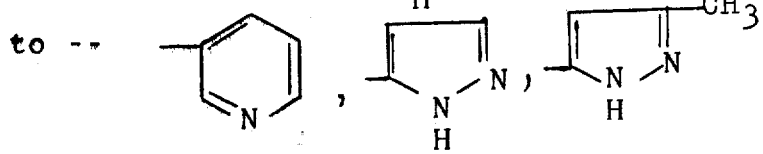

to --  --;

Col. 5, line 35, change " B" " to -- D" --;
Col. 8, line 30, change "form" to -- chloroform --;
Col. 8, line 60, change "continuously" to -- continually --;
Col 10, line 2, change "3.08" to -- 3.80 --;
Col. 11, line 70, change "     O     " to --     O     --;
                              ||                    ||
                            CH₂O              CH₂O—C
Col. 12, line 54, after "given", insert -- in --;
Col. 13, line 13, change "m" to -- mg --;
Col. 13, line 19, change "m." to -- ml --;
Col. 15, line 10, change "CO" to -- OCO --;
Col. 15, line 20, delete "F" (second occurrence).

Signed and sealed this 16th day of July 1974.

(SEAL)
Attest:

McCOY M. GIBSON, JR.  C. MARSHALL DANN
Attesting Officer  Commissioner of Patents